United States Patent
Kim et al.

(10) Patent No.: US 6,478,021 B1
(45) Date of Patent: Nov. 12, 2002

(54) SAW BLADE FOR PREVENTING UNDERCUT

(76) Inventors: Youn Chul Kim, 106-1107 Seongji Apt., 1811-1 Kwonseon-Dong, Kwonseon-Ku, Suwon-Shi Kyongki-Do 441-390 (KR); So Young Yoon, 23-1204 Hyundai Apt., Ichon-Dong, Yongsan-gu Seoul 140-030 (KR)

(*) Notice: Subject to any disclaimer, the term of this patent is extended or adjusted under 35 U.S.C. 154(b) by 13 days.

(21) Appl. No.: 09/714,415

(22) Filed: Nov. 16, 2000

(30) Foreign Application Priority Data

Dec. 17, 1999 (KR) ............................................ 99-58579

(51) Int. Cl.$^7$ ................................................ B28D 1/04
(52) U.S. Cl. ...................... 125/15; 481/542; 481/543; 481/546; 481/548
(58) Field of Search ............................ 125/15; 451/542, 451/543, 546, 548

(56) References Cited

U.S. PATENT DOCUMENTS

| | | | | | |
|---|---|---|---|---|---|
| 4,462,382 A | * | 7/1984 | Baron et al. | .................. | 125/15 |
| 4,854,295 A | * | 8/1989 | Sakarcan | .................... | 125/15 |
| 5,285,768 A | * | 2/1994 | Messina | ...................... | 125/15 |
| 6,321,738 B1 | * | 11/2001 | Walsh | .......................... | 125/15 |

\* cited by examiner

*Primary Examiner*—Joseph J. Hail, III
*Assistant Examiner*—Shantese McDonald

(57) ABSTRACT

The present invention relates to a saw blade for preventing undercut wherein out of the sludge discharging slots arranged together with undercutting segments and ordinary cutting segments on the circumference of a steel wheel, those slots located behind the undercutting segments are dimensioned larger or wider than the slots behind the ordinary cutting segments in order to prevent the breakage and falling-off of the undercut preventing segments and ordinary cutting segments. Thus, according to the invention, there is provided a saw blade including a steel wheel, and on the circumference of said steel wheel, plural ordinary cutting segments and undercut preventing segments, two or more segments of one type being arranged alternately with one or more segments of the other type, characterized in that at the rear faces of respective ordinary cutting segments narrow slots with a predetermined narrow clearance n are formed for minor discharge of cut sludge and at the rear faces of respective undercut preventing segments wide slots with a larger clearance w than the narrow slots are formed for major discharge of cut sludge, the directions being based on the rotation of the blade wheel.

2 Claims, 3 Drawing Sheets

SAW BLADE FOR PREVENTING UNDERCUT

FIELD OF THE INVENTION

The present invention relates to a saw blade for preventing undercut to be used for cutting a hard and rough material like green concrete and asphalt and more particularly a saw blade for preventing undercut characterized in that out of the sludge discharging slots arranged together with undercutting segments and general cutting segments on the circumference of a steel wheel, those slots located in the rear faces of the undercutting segments are dimensioned larger or wider than the slots in the rear faces of the ordinary cutting segments in order to prevent the breakage and falling-off of the undercut preventing cutting segments and ordinary cutting segments.

BACKGROUND OF THE INVENTION

According to a conventional undercut preventing saw blade which is shown in the attached drawing of FIG. 1, on the circumference of a steel wheel 2, there are alternately arranged ordinary cutting segments 3 containing diamond powders and undercutting segments 4 dropped on one of the opposite sides as well as sludge discharging slots 5 each with a specified opening formed between respective neighboring cutting segments.

In the case that only uniform ordinary slots are formed behind every ordinary and undercut preventing cutting segments in the direction of rotation, however, the following problems are caused when using the saw blade.

In case that all are ordinary slots, an undercut preventing cutting segment the lateral cross section of which is larger than that of an ordinary cutting segment experiences more cutting resistance than an ordinary cutting segment.

As the result, when the material being cut is hard and coarse like asphalt or concrete, some of the sludge including powders and scraps of the material are choked in the clearance between the saw blade, particularly the undercutting cutting segments, and the material being cut failing to rapidly discharge as if it is attached on the surfaces of the saw blade. Thus, the sludge on the peripheral surfaces of the blade at the area of undercutting cutting segments exerts radially outward force upon the undercutting cutting segments through the centrifugal force due to the rotating saw blade resulting in occasional breakage or falling-off of some undercutting cutting segments.

SUMMARY OF THE INVENTION

The present invention which was created to deal with the above described circumstance intends to provide a saw blade for preventing undercut wherein out of the sludge discharging slots arranged together with undercutting cutting segments and ordinary cutting segments on the circumference of a steel wheel, those slots located at the rear faces of the undercutting cutting segments are dimensioned relatively larger or wider in order to prevent the breakage and falling-off of the undercut preventing cutting segments and ordinary cutting segments.

To that end, there is provided a saw blade including a steel wheel and on the circumference of said steel wheel plural ordinary cutting segments and undercut preventing segments, two or more segments of one type being arranged alternately with one or more segments of the other type, characterized in that at the rear faces of respective ordinary cutting segments narrow slots with a predetermined narrow clearance are formed for minor discharge of cut sludge and behind respective undercut preventing segments wide slots with a larger clearance than the narrow slots are formed for major discharge of cut sludge, the directions being based on the rotation of the blade wheel.

DETAILED DESCRIPTION OF THE INVENTION

A preferred embodiment of the invention will be described below with reference to the attached drawings.

Figure 1:
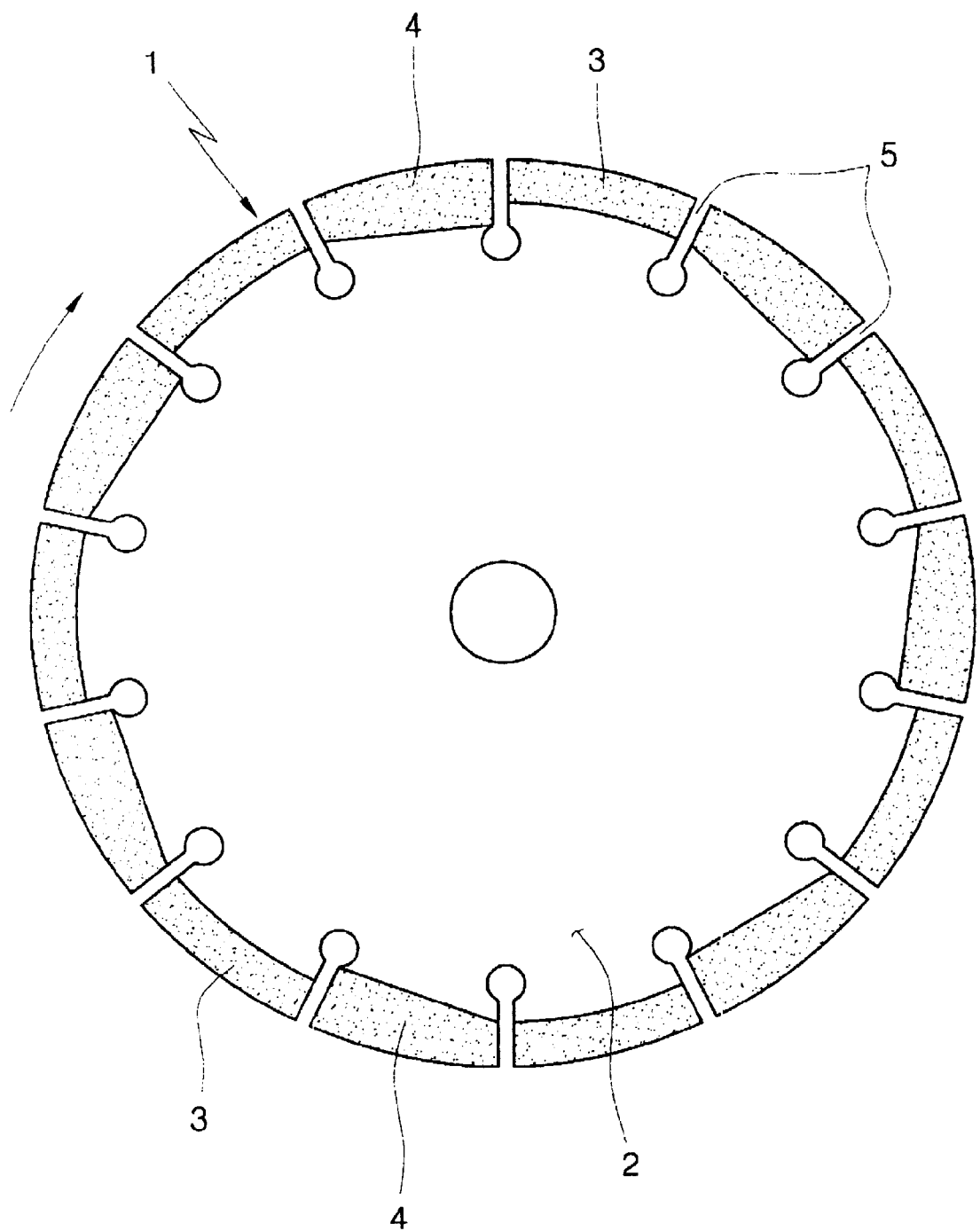
FIG. 1 shows the front view of a saw blade for preventing undercut according to an example of the conventional art.
Figure 2:
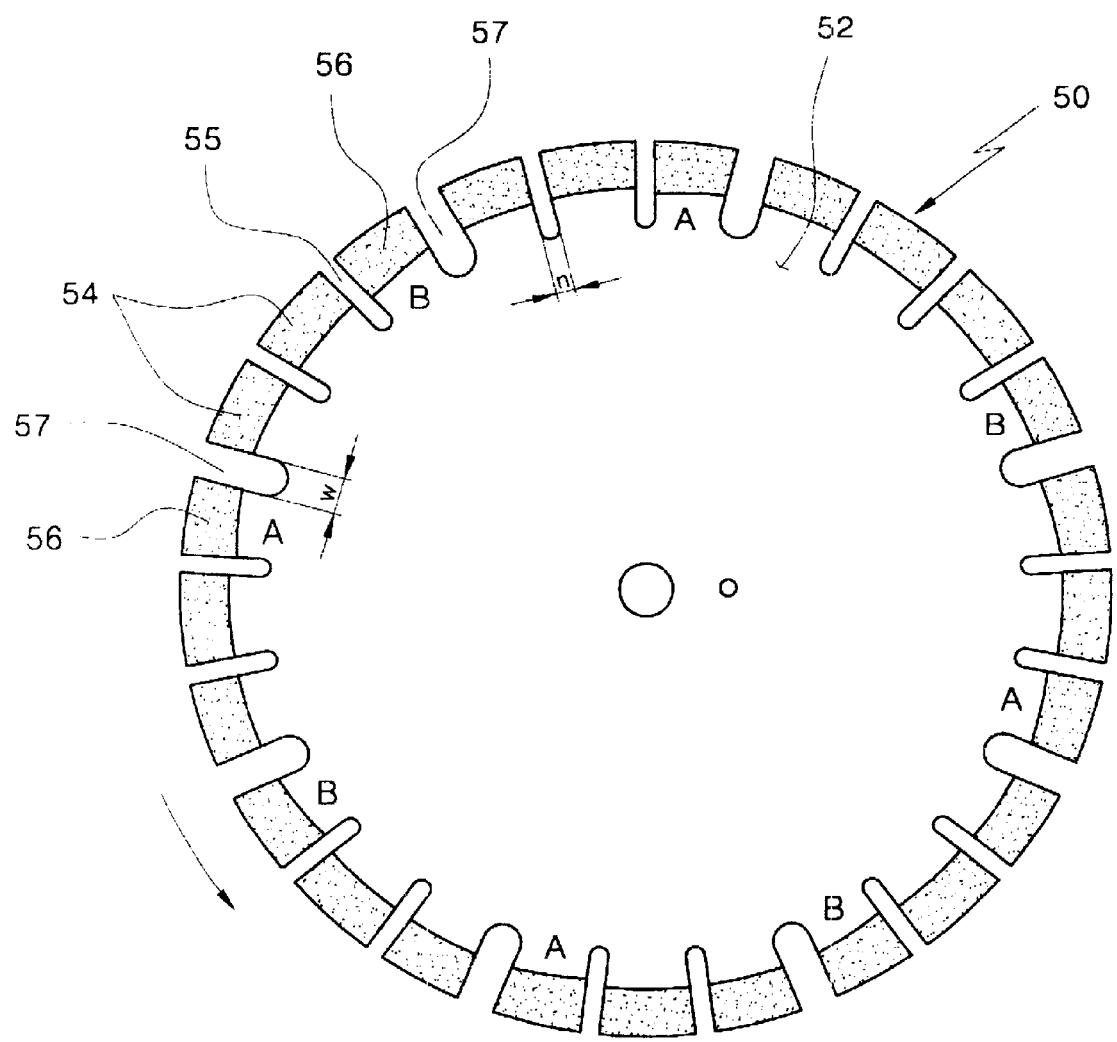
FIG. 2 shows the front view of a saw blade for preventing undercut according to a preferred embodiment of the present invention and FIGS. 3a and 3b show the enlarged detailed views of the portions marked A and B in FIG. 2.

Referring to FIG. 2 which shows an undercut preventing saw blade according to the invention, a steel wheel 52 provided with a plurality of diamond powder containing ordinary cutting segments 54 and a plurality of undercut preventing segments 56 is shown as arranged in such a manner that basically two ordinary cutting segments 54 are arranged between two neighboring undercut preventing segments 56 and additionally in one unit of zone there are disposed three ordinary cutting segments 54.

As a matter of course, such an arrangement is just an illustration and so any other manner of arrangement including the provision of other than two successive ordinary cutting segments may be adopted.

Behind respective ordinary cutting segments 54, narrow slots 55 with a predetermined narrow clearance n are formed for minor distributed discharge of cut sludge, and behind respective undercut preventing segments wide slots with a larger clearance w than the narrow slots 55 are formed for major bulk discharge of cut sludge.

The distinction between the front and rear of the ordinary cutting segments and the undercut preventing segments is based on the direction of rotation for a diamond saw blade when the cutting operation is performed.

That is, for example, when the saw blade 50 is rotated anticlockwise as shown in FIG. 2, the front end of an undercut preventing segment 56 in the direction of rotation represents the front face and likewise the rear end of an undercut preventing segment 56 in the direction of rotation represents the rear face.

The same holds true for the ordinary cutting segments 54.

Figure 3A:
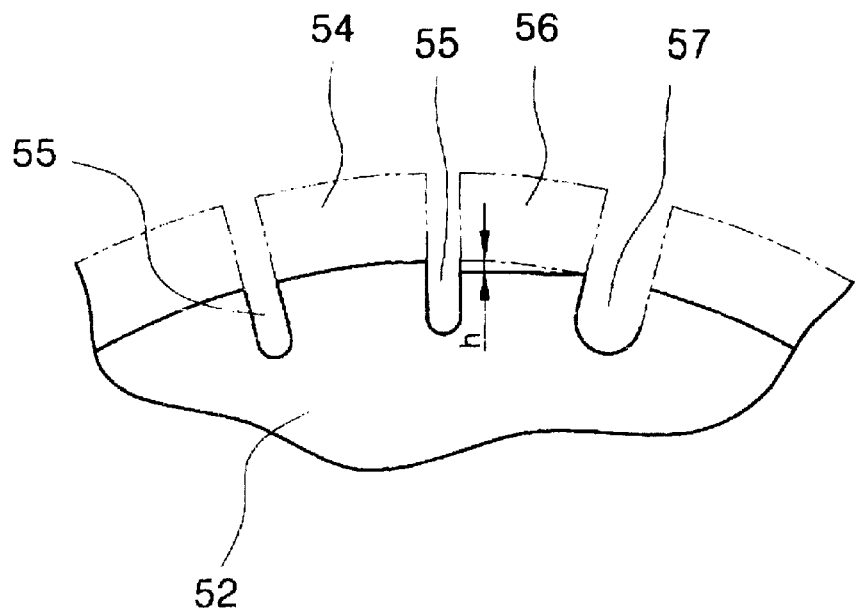
Figure 3B:
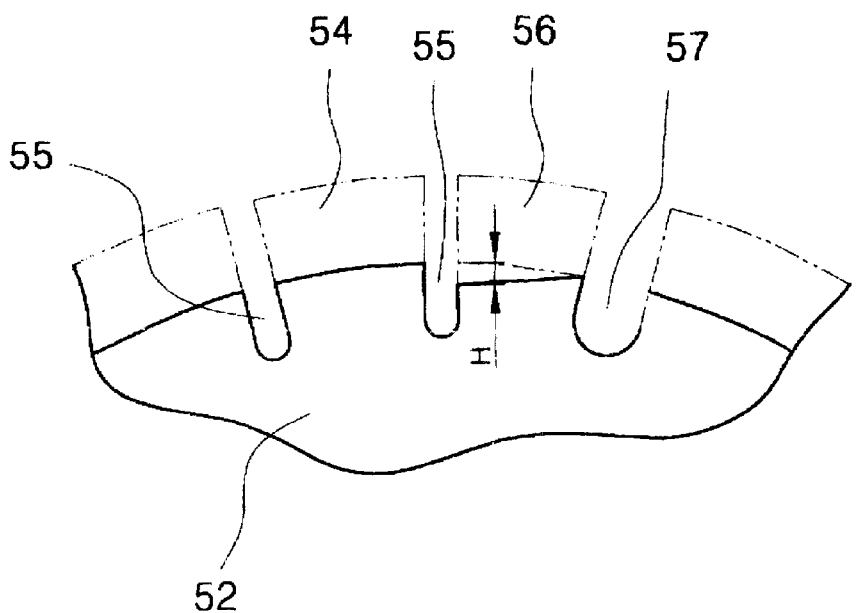

Further, according to the present invention, the front positions A and B of those alternate portions of the steel wheel around its circumference, on which alternate portions the corresponding undercut preventing segments are attached, may have predetermined dimensions H and h (H<h)different from each other as shown in FIGS. 3A and 3B, wherein the dimension H and h denote the radial distances between basic radius of the steel wheel and the actual diminished radius of the steel wheel at the mutual corresponding front positions.

In this way, cutting performance can be remarkably improved due to the resultant difference in the height between the neighboring undercut preventing segments 56.

The operation of the saw blade according to the invention, constructed as above, is described below.

When the material like asphalt or concrete is cut by an undercut preventing saw blade 50, the produced powders or scraps of the material being cut are subjected to centrifugal force due to the high rotating speed of the saw blade 50.

At that time, the discharged quantity of sludge from the material is not only increased but cutting operation is also smoothly conducted thanks to the provision of the enlarged slots 57 which have wider clearances w than the narrow slots 55.

Therefore, the undercut phenomena by the two successive ordinary cutting segments 54 (or three successive ordinary cutting segments) positioned behind the undercut preventing segment 56 as the reference or by the other undercut preventing segments positioned further backward can be prevented, because the sludge produced from the material under cutting operation is discharged on the rear side of the undercut preventing segment under consideration in a great deal of quantity and at a high speed.

Furthermore, as narrow slots 55 are located at the rear faces of the respective ordinary cutting segments 55, multiple divided discharges in a small quantity have the desirable effect of distributed discharge.

It was found out that the desirable ratio of the dimension of the narrow clearance n to that of the wide clearance 4 measures about 1 to 3.

As suggested above, according to the invention, the discharging performance is improved because of easy efflux of the sludge from the material being cut and at the same time the undercut phenomena can be effectively prevented, whereby the undercut preventing segments 56 and the ordinary cutting segments 54 can be prevented from breakage or drop-out.

It is to be understood that, while the invention was described with respect to some specific embodiments, the invention is never restricted to those embodiments and a variety of modifications and alterations would be possible to a man skilled in the art by referring to the description or drawings presented here and within the spirit of the invention and thus those modifications or alterations are intended to fall within the scope of the invention, which scope should be limited only by the attached claims.

What is claimed is:

1. A saw blade comprising a steel wheel having plural ordinary cutting segments on the circumference of the steel wheel and undercut preventing segments on the circumference of the steel wheel, two or more segments of a first type are arranged alternately with one or more segments of a second type, a predetermined difference in the height or the distance in a radial direction between two sequential undercut preventing segments exists and narrow slots with a predetermined narrow clearance are formed for minor discharge of cut sludge at the rear faces of respective ordinary cutting segments and wide slots with a larger clearance than the narrow slots are formed for major discharge of cut sludge at the rear face of respective under cut preventing segments formed for major discharge of cut sludge at the rear faces of respective under cut preventing segments.

2. The saw blade as claimed in claim 1, wherein a ratio of dimension of the narrow clearance to that of the wide clearance measures about 1 to 3.

* * * * *